(12) United States Patent
Pan

(10) Patent No.: US 6,325,412 B1
(45) Date of Patent: *Dec. 4, 2001

(54) FASTEN-ON AIR BAG DEVICE

(76) Inventor: Yue Ming Pan, 2/F., 38-2 Chinan Road, Sec. 2, Taipei 100 (TW)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/222,892
(22) Filed: Dec. 30, 1998
(51) Int. Cl.$^7$ .................................................. B60R 21/18
(52) U.S. Cl. ..................... 280/733; 280/730.1; 180/268
(58) Field of Search ................................ 280/733, 730.1; 180/268

(56) References Cited

U.S. PATENT DOCUMENTS

| Re. 36,587 | * | 2/2000 | Tanaka et al. | 280/733 |
|---|---|---|---|---|
| 3,866,940 | * | 2/1975 | Lewis | 280/733 |
| 5,393,091 | * | 2/1995 | Tanaka et al. | 280/733 |
| 5,720,519 | * | 2/1998 | Barnes | 297/216.11 |
| 5,794,971 | | 8/1998 | Boydston et al. | 280/733 |
| 5,892,436 | * | 4/1999 | Blackburn et al. | 180/268 |
| 5,924,726 | * | 6/1999 | Pan | 280/733 |
| 6,062,596 | * | 5/2000 | Boydston et al. | 280/733 |

FOREIGN PATENT DOCUMENTS

83436 * 3/1989 (JP) ...................................... 280/733

OTHER PUBLICATIONS

Car & Life Magazine, An Air Belt developed by the Honda Corp. of Japan, pp. 31 & 33, Feb. 25–Mar. 1, 1998.

* cited by examiner

Primary Examiner—Douglas Hess
Assistant Examiner—Elaine Gort
(74) Attorney, Agent, or Firm—Dougherty & Troxell

(57) ABSTRACT

A fasten-on air bag device comprises an air bag housing which is attachable to the seat restraints and can be fastened-on by occupant; a crash sensing system for sensing and evaluating the crash data; an inflator installed inside the air bag housing, a plug-in signal-transmission receptacle and a detachable plug affixed to the air bag housing. By coupling with the plug-in signal transmission receptacle, the fasten-on air bag device can be utilized not only on the front seats but also the rear seats, and can be applied on all kinds of vehicles such as cars, buses, trains and airplanes. The direction of explosion is guided by the guiding core to assure the deployment of the air bag go outward and forward away from the occupant's body instead of aiming toward the occupant's body. In addition, the protective shield lining and the spread plastic lobes further protect the occupant's body. Therefore, the explosive expansion of the air bag would less likely cause harm to the occupant.

11 Claims, 9 Drawing Sheets

FASTEN-ON AIR BAG DEVICE

BACKGROUND OF THE INVENTION

1. Field of the Invention

This invention relates to the air bag device for protection of vehicle occupants, particularly, to an air bag pack that is attachable to seat restraint and can be fastened-on by occupant. It can be manufactured into different sizes and shapes to meet the need for all kinds of occupant's body sizes and can be modified to utilize on the child safety seat or wheel chair and other types of vehicles.

2. Description of Related Art

The efficiency of air bags to protect vehicle occupants from injury during frontal crashes is well documented and proven. According to the statistics from NHTSA (National Highway Traffic Safety Administration) of USA, the air bag protection means have saved 3,148 lives as of June 1998. However, the statistics of NHTSA also indicate 61 children and 44 adult fatalities from the shock of the expanding air bags in the same period of time. Air bag fatalities are caused by a combination of proximity to deploying air bags and the current designs of those air bags. Conventionally, most of the air bag protection means are installed at fixed places inside the auto body, intended to serve as a cushion for the driver/passenger at the front seat against crash impact. Gas inflator is used to deploy the air bag when an impact beyond a certain threshold is detected. However, the deployment of the air bag is right faced toward the occupant, therefore may possibly cause injury or even fatality to occupants esp. infants or children sitting at the front seats. Moreover, for those cars equipped with two or more air bags, unless they have installed occupant sensing systems, all of the air bags would be ignited and expanded in the event of a crash that would cause damage to the auto body where the device is installed. Consequently repair & replacement cost will be quite high.

The air bag suppliers and vehicle manufacturers are trying to develop the advanced air bags to reduce the adverse effect of the conventional air bag systems. Such as: occupant classification and proximity sensors to identify whether the occupants in the keep-out zone or not; and multistage inflators to provide more tailored responses for a variety of occupants and crash severity, etc. However, there are still drawbacks of the conventional air bag devices described as below.

(1) The major factor that causes the air bag injuries or even fatalities is the direction of the air bag deployment aiming at the occupants as target. Currently, most of the conventional air bags are installed on the steeling wheel, the dashboard or window side, which they are designed to expand toward the occupants. Once the occupants are not sitting at the proper position that keeps a good distance from the air bags or they slide into the keep-out zone during the sudden crash, they may be possibly injured by the fast expanding air bags.

(2) conventional air bag devices are fixedly installed at specific places in the vehicle interior. The air bag devices are mostly tailored based on adult male size. For occupants with a smaller body size or with big belly or pregnant women, these air bags may cause harm when expanded.

(3) since conventional air bag devices are typically installed at fixed places, mostly at the front seats, they can provide the cushioned protection only to those people sitting at these places where the air bag devices are installed. To those people sitting on the rear seat, there is still lack of air bag protection.

(4) high repair cost will be incurred due to damage of the vehicle interior where the air bags installed, such as in the steering wheel, the dashboard, the ceiling, the window and the chair side, once the expansion of the air bag occurs. To repair a deployed air bag device, one has to replace not only a new air bag module but also the damaged auto body. And if there is no "occupant sensing system" installed, all the air bags will be expanded in the event of a crash. Consequently, the repair cost would therefore be considerably high.

Many researchers are trying to overcome the adverse effects of conventional air bags. For examples: the Honda corporation of Japan comes up with an air bag device, which can be buckled around the driver or/and passenger. Another new patented design named as "Portable Air Bag" (U.S. Pat. No. 5,794,971), claims a round cylindrical shaped air bag device that can be connected to the lap belt of seat belt. This "Portable Air Bag" contains a pressurized gas cylinder installed inside the enclosure, and can be activated and released the gas to deploy the air bag during a crash. These new designs have more advantages over the conventional air bags in that they may less likely cause harm to the occupants and are easily to be replaced after deployed. Both of these new models are attached on the seat belt, which means on the occupant's side. By which the direction of the deployment will be ignited from the occupant's body toward the steeling wheel or the dashboards rather faced toward the occupant's body as the conventional air bags do. Also the applications of these models will not be limited at the front seats only. They can be installed and attached with the seat belts at the rear seats.

However there are still some drawbacks can be pointed out from these new models as followings:

The "Air Belt" from Honda still has the potential hazards of causing harm to the user's head and chest due to the installation of the "Air Belt" is right at the shoulder belt of the user which is very close to the user's head. Also, its fixed size may not be suitable and be potentially harmful to those people with small figure or to pregnant women and children. While comparing to the above disadvantages of Air Belt, the characteristics of attachable and releasable of the "Portable Air Bag" overcomes the above mentioned problems. Yet due to the round cylindrical shape and the gas tank inside, the Portable Air Bag does cause some other problems. Such as:

1. Uncomfortable: It may not be comfortable to have a long cylindrical tank laying across occupant's stomach during driving, esp. to people with big round belly and pregnant women. Plus the weight of the gas tank may arise more discomfort loading to the users.

2. Limited application: the long cylindrical shape of the gas tank and the location to place the crash sensor plus the long leashed cable will confine the prevalence of Portable Air Bag.

3. Uncontrollable deploying direction: Due to the round shape of the tank and the lack of any guiding device, it is difficult to assure the direction of the air bag deployment will be right ahead of the user's body. Especially, at the time during the sudden crash impact, the driver's and passenger's body that carry the round tank will be at a fast moving and highly unstable stage. The uncertain deploying direction may hurt the users.

4. Cumbersome: Most of all, the major concept of the Portable Air Bag, according to its inventors, was to contain all the necessary components of the conventional fixed air bag type system in a single portable unit. That means the Portable Air Bag comprises a folded air bag, a pressurized gas container, as gas inflator, a controllable gas release valve and a control/sensor for activating the device all together as "one complete portable unit". The control/sensor device can be either designed into one single unit that set in the portable enclosure or into two separated systems. In the latter, the control device for operating the gas release valve is enclosed in the portable unit and connected to the sensor. While the electrical sensor can be designed as one single unit or a plurality of sensors positioned within the device or at a remote form. They use a plug-in module, which contains the electrical connection and a sensor to get the power supply from the automobile through a receptacle. The plug assembly is connected to the potable enclosure through a separable connector. The portable air bag has to be leashed with a cable to get its power supply, which makes this portable air bag device cumbersome.

5. Unreliable: The inventor's preferred location to place the crash sensor is on the firewall to fulfill the easy access as their objective of portability. The firewall, which is at the passenger compartment, is a non-crash zone. As auto safety researchers point out, it is generally less reactive in impacts. The passenger compartment signals is initially weak but builds up rapidly and possibly not giving the sensor sufficient time to fire. The passenger compartment sensor is particularly difficult to detect the high-speed pole crashes and the angle barrier crashes (as disclosed in "Single Point Sensing and Structural Design of Vehicles" by G. Mahon & M. Masiello, SAE paper No. 920119). Crush-zone sensors are necessary for a complete sensing system ("A Critique of Single Point Crush Sensing" by D. Breed et al., SAE paper No. 920124). Single point sensor from the passenger compartment can be difficult for certain type of events and for certain types of vehicles (Sensing Consideration and Tradeoffs for Single Point Sensing" by J. P. Kelley, SAE paper No. 932916). The location to place the sensors is critically affected by the vehicle structure thus may be varied by vehicle types. Consequently, the sensing system should be designed based on the vehicle structure and is best to be installed by the automobile manufactories to be part of the auto body as a whole. The concept of "one complete portable air bag unit" that contains the sensing system may not be feasible to meet the need of all kinds of automobiles. The premise of an air bag device to offer the protection for occupants should not be jeopardized by the feasibility of the "portability".

SUMMARY OF THE INVENTION

The main objective of the present invention is to provide a fasten-on air bag device that can be separately equipped rather then fixed in the auto body. By coupling with a plug-in signal-transmit system, the air bag device of present invention can be connected to the sensing system of the automobile, thus can be utilized in more flexible designs. It can be designed as a model that is easily attached to seat restraint and readily plugged into the signal transmission receptacle box for use. Or it can be designed as a model that is coupled with the signal transmission receptacle box and be readily buckled up with the seat belt. So that the location of the air bag device will not be limited to be set at the front seat of the vehicles, it can be applied at the rear seats of the vehicles too. Moreover, it can be designed as a portable style and be easily carried by the users on board any kinds of transportation. For example, on buses, trains airplanes. It can even be modified and adapted to be used on the child safety seats or handicapped wheel chairs and even on the roller coasters. It simplifies the installation and lowers down the repair and replacement costs of the air bag device.

Another objective of the present invention is to provide a fasten-on air bag device, which can be simply plugged into a connector of a crash sensing system to reach a standby state and to detect whether the seat is being occupied. Once a crash happens, only the air bags on the seats that's being occupied will be deployed. That will reduce the unnecessary cost of replacing the air bags not been occupied.

Another objective of the present invention is to provide a fasten-on air bag device in which the direction of its deployment will be expanded outward from the occupant instead of toward the occupant so that the occupant would not be hurt by the powerful explosive expansion of the air bags. It well promotes the protecting function, and minimizes the potential hazard to the occupants.

Another objective of the present invention is to provide a fasten-on air bag device, which can be easily detached from and attached to the fixed installation of vehicles. It is portable, and can be manufactured into different sizes to meet the need of users at different physical sizes. It can be simply applied with seat belts, or be modified to adapt to the child safety seats, handicapped wheel chairs or roller coasters. It enhances and personalizes the air bag crash-protection system.

In accordance with the foregoing and other objectives of the present invention, a new fasten-on air bag device is provided. The fasten-on air bag device of the invention comprises: an air bag pack attachable to the seat belt and a crash sensing means for detecting and evaluating whether a crash happens to the vehicle. The crash sensing means will generate a trigger signal once the crashes exceed certain threshold. The air bag pack formed by an outer plastic pack, a piece of protective shield lining, a folded air bag and a guiding core. Said guiding core encapsulates an explosive means; said explosive means, will explode when ignited by the trigger signal from the crash sensing means. A signal transmission receptacle means for coupling the air bag pack is wired to the crash sensing means. A detachable plug means, affixed to the air bag pack, can be plugged into the receptacle means to accomplish the electric connection between the explosive means with the crash sensing means. The fasten-on air bag device of the invention can be easily mounted in position for use and is easily detached to be replaced. Further, it can be set to the standby state simply by buckling up the seat belt as one's usual driving habit at the same time snapping the plug into the connector that connected to the sense system. When the air bag is being expanded in the event of a crash, the expansion goes outward away from the occupant's body toward the steering wheel or dashboard rather than blowing out from the steering wheel or dashboard toward the occupant's body. Therefore, the explosive expansion of the air bag would less likely cause harm to the occupant.

Basically, the present invention leaves the sensing system be placed at the most suitable locations that designed by the automobile manufacturers, but uses a plug-in signal transmitting receptacle to transmit the signal to the fasten-on air bag pack. As a result, the fasten-on air bag pack contains only the gas inflator pellets and the folded air bag plus a guiding core and a protective shield, thus makes the air bag device in a light weight and portable pack.

BRIEF DESCRIPTION OF DRAWINGS

The invention can be more fully understood by the following detailed description of the preferred embodiments, with reference made to the accompanying drawings, wherein.

DETAILED DESCRIPTION OF PREFERRED EMBODIMENTS

Figure 1:
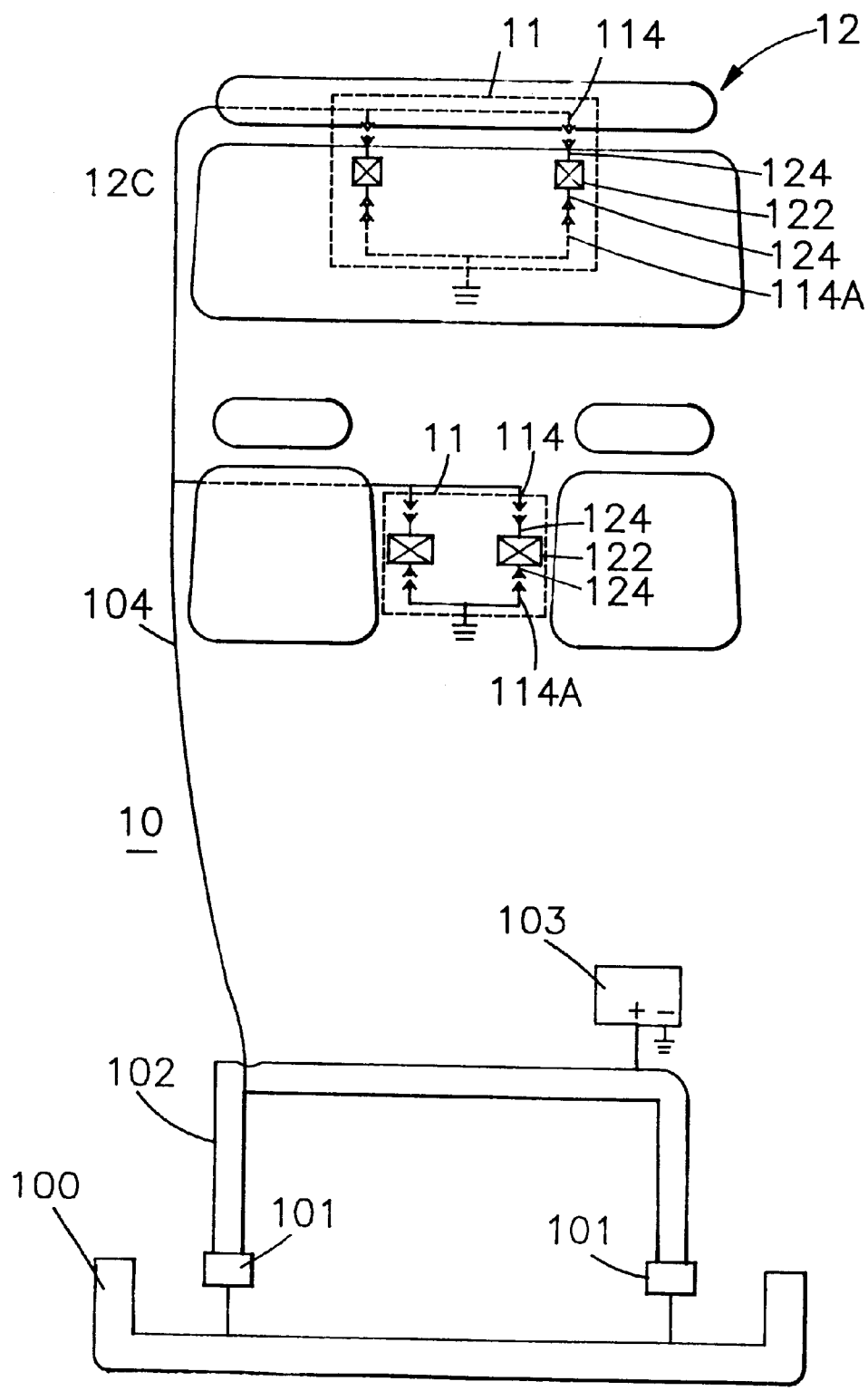
FIG. 1 is a schematic diagram showing the crash sensing circuit utilized in the fasten-on air bag device of the invention.
Figure 2:
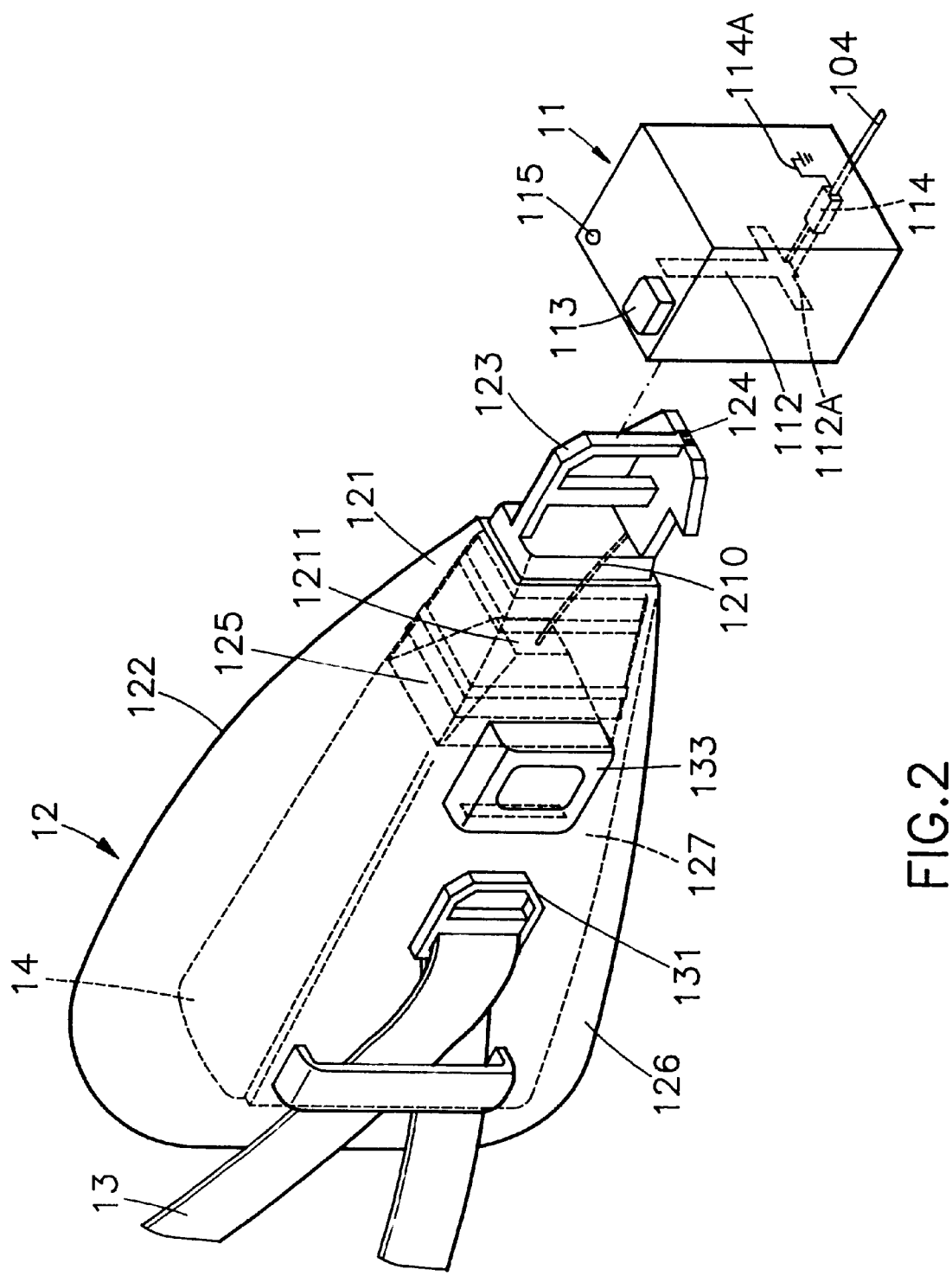
FIG. 2 is a perspective view of the fasten-on air bag device of the invention.

The fasten-on air bag device 12 of the invention, as shown in FIGS. 1–3, comprises a crash sensing system 10, a fasten-on air bag housing 122 and a signal transmission receptacle box 11. The crash sensing system 10 comprising the crash sensors 101, a cable 104, 1210, an electric male and female connectors 114, 124 and the ground 114A are set at the appropriate locations that can ultimately detect the possible crash impacts. The locations to place the crash sensors 101 depend on the vehicle structure and are best to be set according to the automobile manufacturer's recommendation. While the crash sensing system 10 is connected to the signal transmission receptacle boxes 11 that set by the seat sides as shown in FIG. 1. Once a crash happens, the impact data can be detected and evaluated by the sensors 101—101. The crash sensing system 10 will determine to initiate the electric signal if the crash status beyond a preset threshold. And the electric signal will be transmitted to the gas-producing pellet of inflator housing 1211 through the crash sensing system 10 and the signal transmission receptacle box 11.

The fasten-on air bag device 12 of the present invention can be either designed as a model that is easily attached to seat belt 13 and ready to be plugged into the signal transmission receptacle box 11 for use. Or it can be designed as a model that is coupled with the signal transmission receptacle box 11 and will be readily buckled up with the seat belt 13. Basically, either model of the air bag devices 12 of the present invention has the same structure. The difference between these models is the way they've been attached.

Figure 3A:
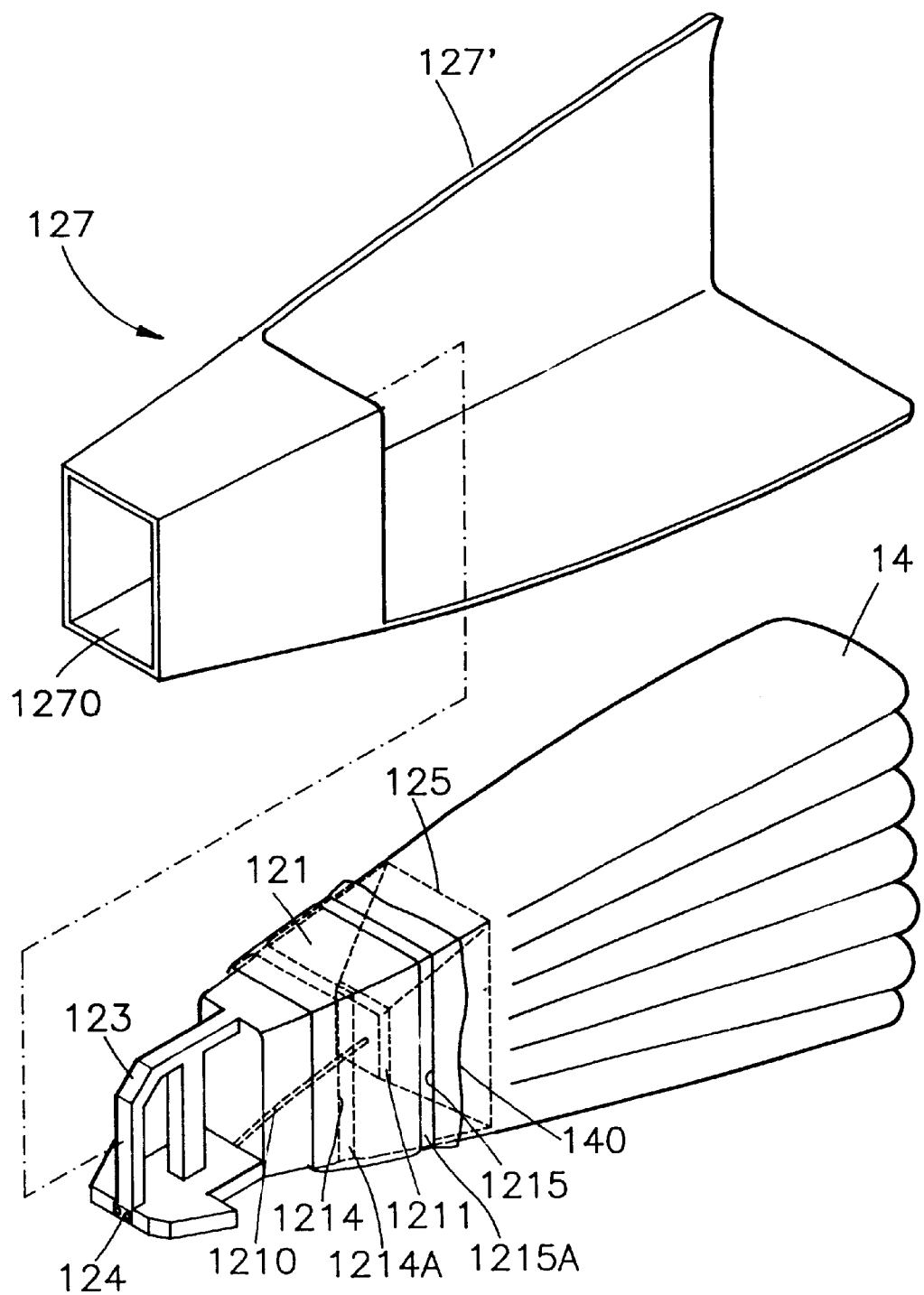
FIG. 3A is an exploded perspective view of the fasten-on air bag device of the invention.
Figure 3B:
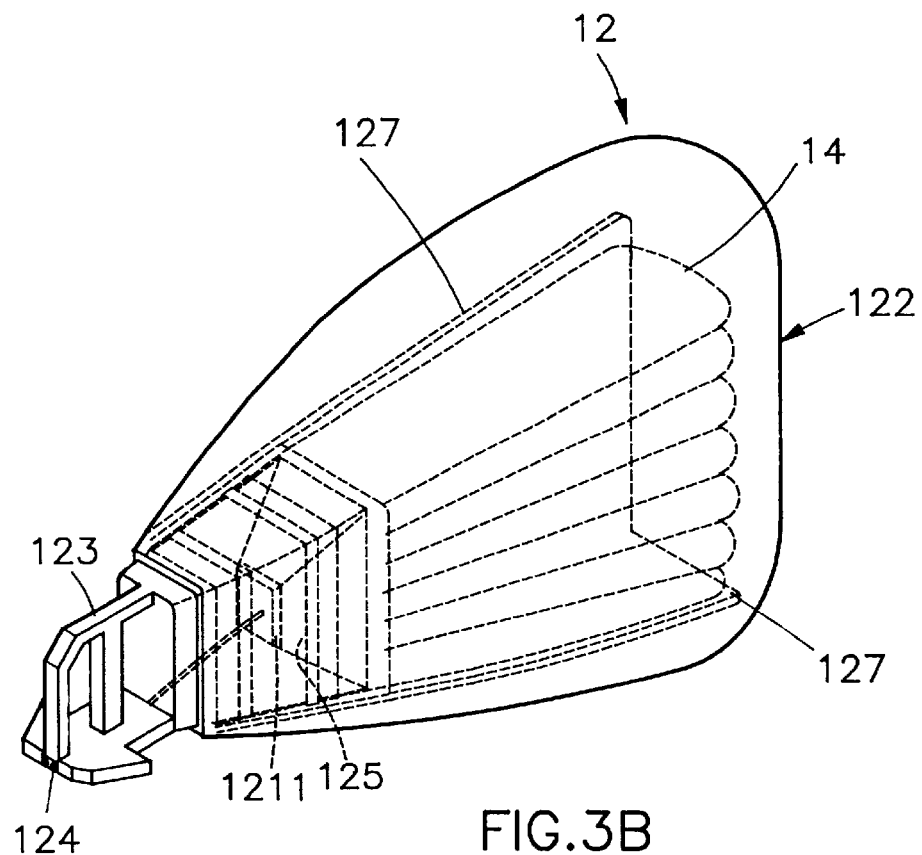
FIG. 3B is a perspective view of the fasten-on air bag device of FIG. 3A.
Figure 3C:
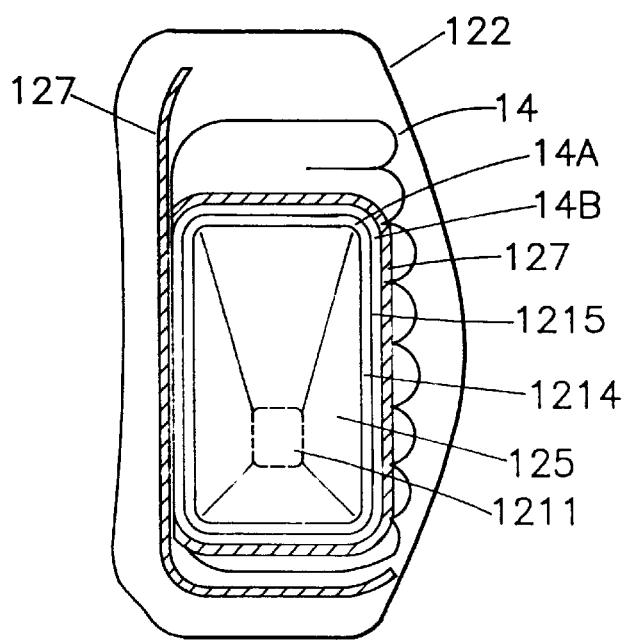
FIG. 3C is a cross sectional side view cut from line 3—3 of FIG. 3B.
Figure 4:
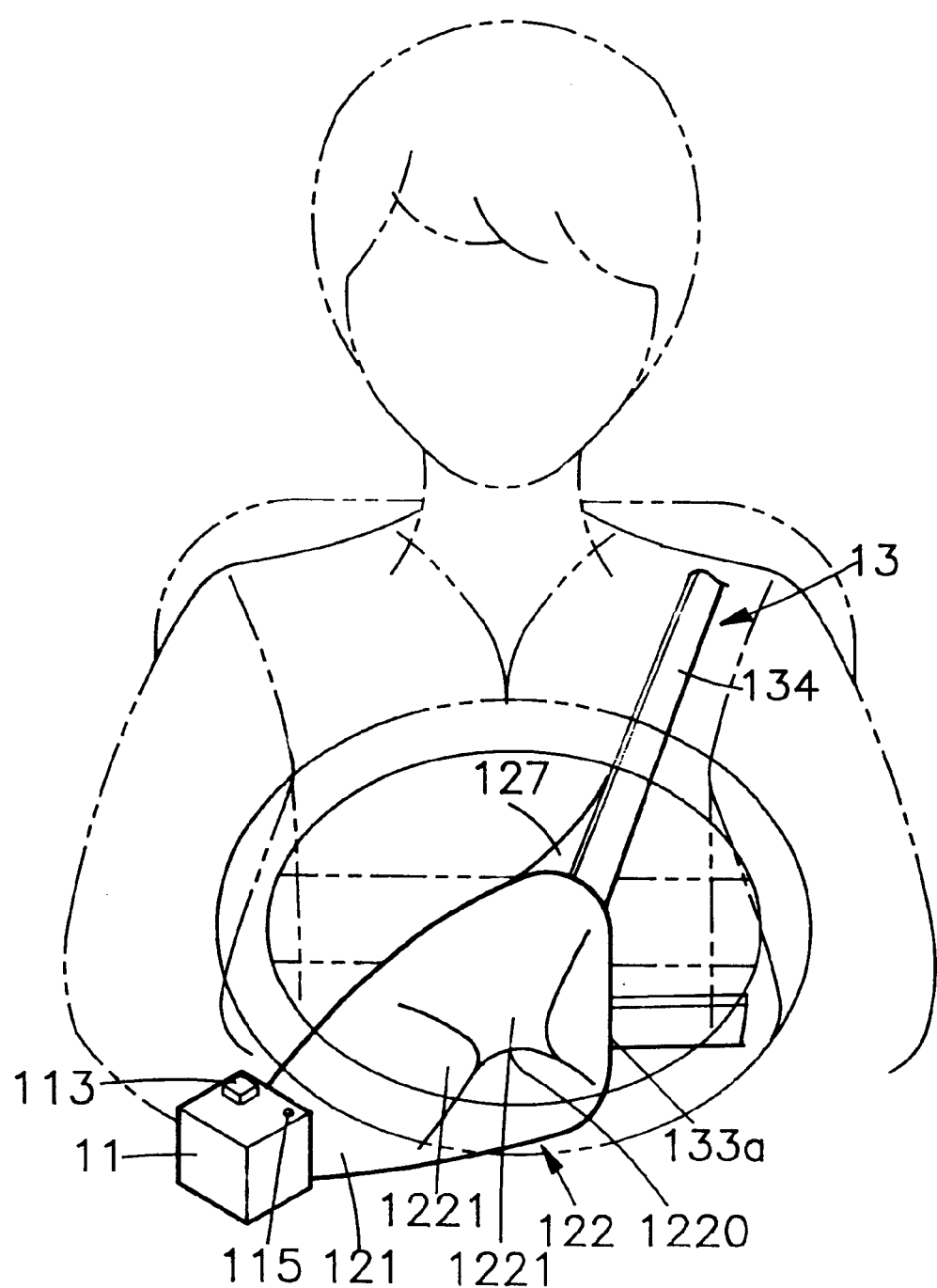
FIG. 4 is a schematic perspective view showing a person wearing the fasten-on air bag device of the invention.

Referring to FIGS. 1–3 is an air bag device 12 of preferred embodiment of the present invention describing a model that is easily attached to seat belt 13 and ready to be plugged into the signal transmission receptacle box 11 for use. In the preferred embodiment, the fasten-on air bag device 12 of the present invention comprises a crash sensing system 10, an outer plastic air bag housing 122, a protective shield 127 lining inside, a guiding core member 125, a folded air bag 14 and an inflator housing 1211. One end of the air bag housing 122 is integrally linked to a base 121. The base 121 has extended inside the plastic air bag housing 122 and formed as a guiding core member 125. Said guiding core member 125 encapsulates gas-producing pellets of inflator housing 1211 and covered by the folded air bag 14. The front end of the base 121 is formed with a T-shaped fastener 123 in which an electrical female connector 124 is provided. Further, the signal transmission receptacle box 11 is formed with a receptacle 112 in which the T-shaped fastener 123 can be inserted. FIG. 3A demonstrates the folded air bag 14 is securely cramped between the guiding core member 125 and the protective shield 127. The guiding core member 125 is first set into the folded air bag 14 through the opening of the folded air bag 14. A certain length of the opening end 140 of the folded air bag 14 is fixed at the first groove 1214 by a first fastener ring 1214A. Then the opening end 140 of the folded air bag 14 is further folded backward and fixed at a second groove 1215 by a second fastener ring 1215A. The base 121, the guiding core member 125 with the folded air bag 14 is then inserted through the opening 1270 of the protective shield 127 and fixed to it with two screws (not shown) and laser fused. The folded air bag 14 is now securely set between the guiding core member 125 and the protective shield 127. A plastic air bag housing 122 as shown in FIG. 3B further wraps the composed protective shield 127, guiding core member 125 and the folded air bag 14. Rupturable seams 1220—1220 (as shown in FIG. 4) are formed after the plastic air bag housing 122 having finished the packing of the fasten-on air bag housing 122 by sealing the four lobes 1221 together. The four lobes 1221 are designed to offer an additional protection for the occupant once the air bag housing 122 is ruptured during the air bag device 12 deployment. As shown in FIG.3C, the gas-producing pellets of inflator housing 1211 is set at the innermost center and encapsulated by the guiding core member 125. The guiding core member 125 is further surrounded by two layers of the air bag 14A, 14B that wrapped around by two fastener rings 1214A, 1215A and the protective shield 127. The air bag is further extended to form the folded air bag 14 and protected by the L-shaped protective shield 127. The composed guiding core 125, the folded air bag 14 and the protective shield 127, 127' are then further wrapped by the plastic air bag housing 122. The guiding core member 125 is served as a direction-guiding device for the inflator housing 1211 to assure the explosion of the gas-producing pellets of the inflator housing 1211 direct forward and upward. That makes the deployment of the air bag direct forward and laterally ahead of the occupant's body. The protective shield 127 and the spreaded lobes 1221 of the plastic air bag housing 122 further protect the occupant's body. In additional, the top surface of the signal transmission receptacle box 11 is equipped with a release button 113 and an indicator lamp 115. The release button 113 is used as a mechanism to disengage the T-shaped fastener 123 of the base 121 from the receptacle box 11. To facilitate the fasten-on air bag be fastened on by occupant, the fasten-on air bag device 12 is furnished with a socket 133 affixed on the back of the fasten-on air bag housing 122. As shown in FIG. 2, the occupant can easily attach the fasten-on air bag device 12 to the seat belt 13 by plugging the seat belt buckle 131 into the socket 133 and set ready for use. While occupant sits in the seat, he or she simply holds the T-shaped fastener 123 of the fasten-on air bag device 12 and inserts it into the signal transmission receptacle box 11. The fasten-on air bag device 12 is thus set in a standby state, meanwhile the indicator lamp 115 on the top of receptacle box 11 will be lit up indicating that the electric male and female connectors 114 and 124 are properly connected to the sensing system 10. The crash sensors 101 are installed in the bumper 100 or other proper locations in the auto body, and are able to trigger a signal to the electrical male connector 114. An electric circuit is accomplished starting from the crash sensors 101 via the cable 104, to the male connector 114 in the signal transmission receptacle box 11 then contacted the female connector 124 on the T-shaped fastener 123 via the cable 1210, and then emitted to the ground line 114A. Once a crash happens beyond the preset threshold, the crash sensor 101 will trigger a signal, which is then transmitted to the inflator housing 1211 through the said electric circuit.

Attribute to its easy attachable and detachable characteristics, the fasten-on air bag device 12 of the present invention can be manufactured into different sizes. Users can choose a suitable model that fit their figures and set readily for use by simply attaching the air bag device 12 onto the seat belt by themselves before driving, as shown in FIGS. 2, 3 and 4. When the occupant sits in the seat, he or she simply holds the T-shaped fastener 123 of the air bag device 12 that attached to the seat belt 13 and plugs it into the signal transmission receptacle box II as the usual habit to buckle up the seat belt. Meanwhile, the indicator lamp 115 will be lit up indicating the connection of the electric circuit from crash sensor 101 to the inflator housing 1211 has been completed and the air bag device 12 has now been set in the standby state.

Figure 5:
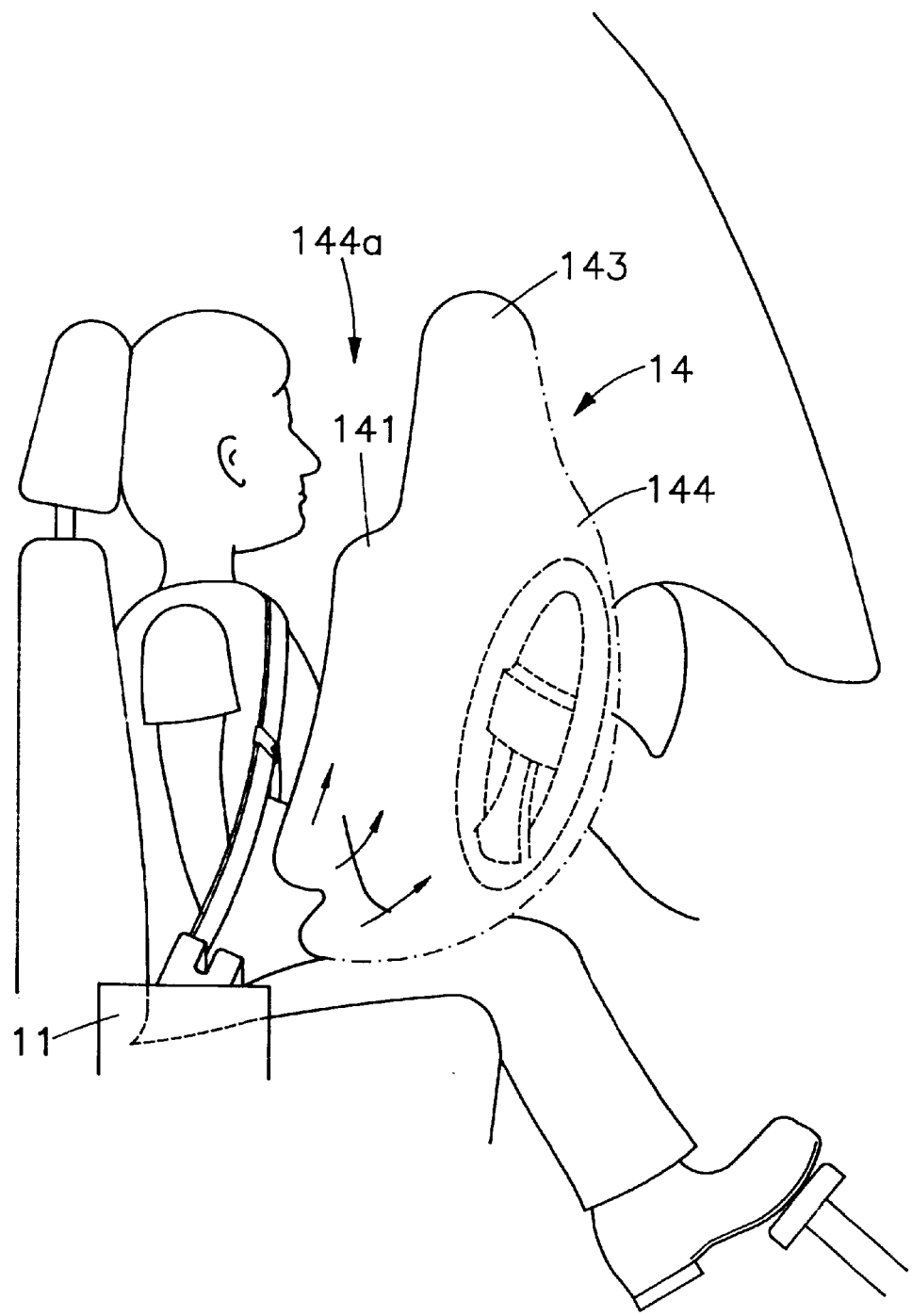
FIG. 5 is a schematic diagram depicting the fasten-on air bag device of the invention when being deployed in the event of a crash.

Should a crash happen, the crash sensor 101 will evaluate the crash data and determine if the crash is severe enough for air bag deployment. Once the crash status is severe beyond the preset threshold, the crash sensor 101 will initiate an electrical signal through the cable 104 and 1210 to the inflator housing 1211, whereby the gas-producing pellets in the inflator housing 1211 will be ignited to deploy the air bag device 12. Thus provides a cushion protection in front of the occupant's body against the impact force from the crash, as illustrated in FIG. 5.

It can be learned from the foregoing description that the fasten-on air bag device 12 of the present invention expands outwards from the occupant instead of toward the occupant as the prior art does. Moreover, the fasten-on air bag device 12 of the present invention has equipped a double safety mechanism to protect the occupant from the possible injury during the air bag deployment. First, the direction of the explosion of the gas-producing pellets is set under control by the metal guiding core member 125 to assure heading outward away from the occupant's body. Second, the protective shield 127 lining and the spreaded plastic lobes offer an additional protection for the occupant from the possible injury caused by the deployed air bag. In addition, the invention is designed to be very convenient to use simply by inserting the T-shaped fastener 123 into the receptacle 112 in the signal transmission receptacle box 11 assuring indicator lamp 115 is lit up. This sets the air bag device in a standby state. The way to set the fasten-on air bag device in the standby state is exactly the same way as the occupant's usually do to buckle up the seat belt 13.

Figure 6:
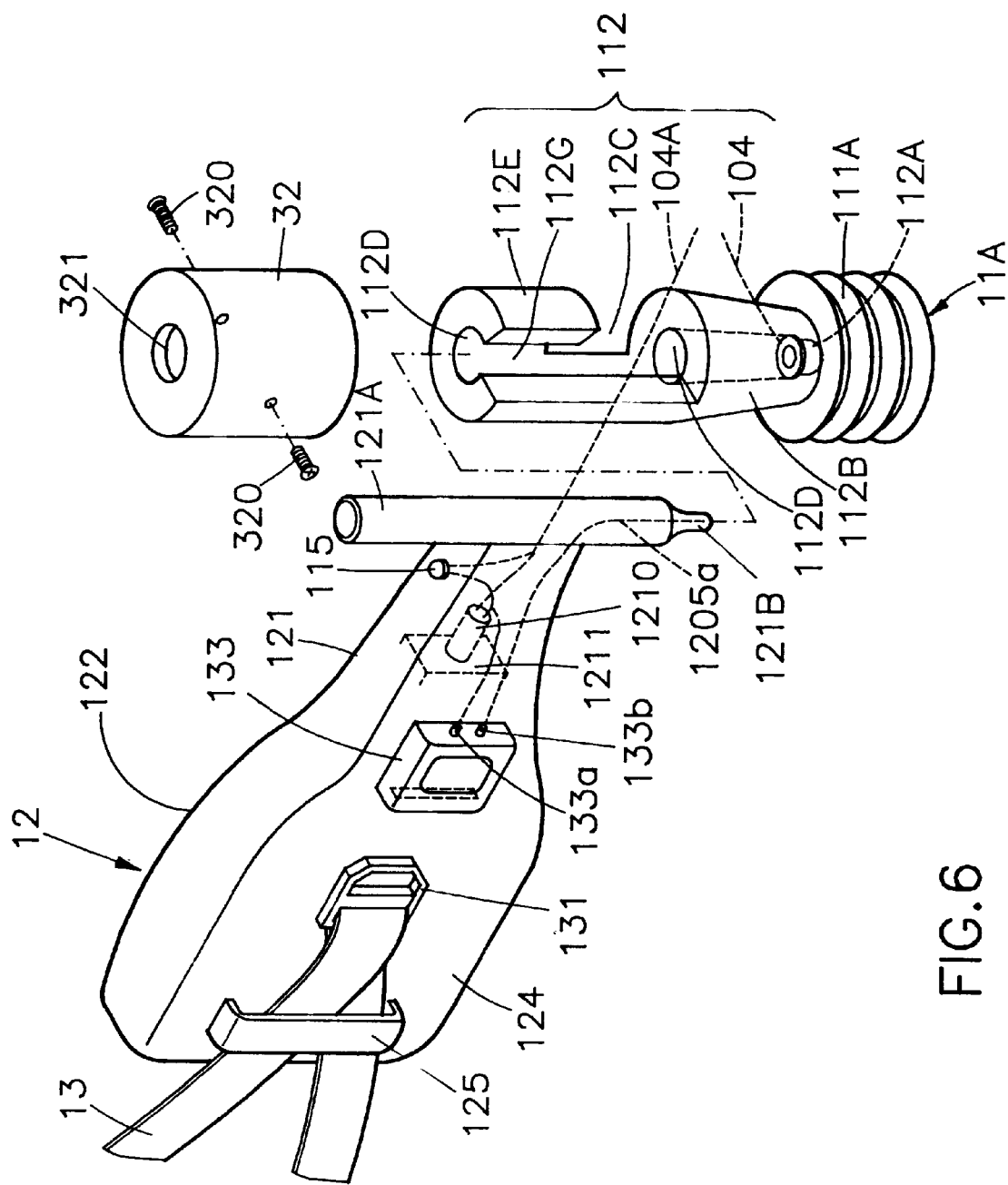
FIG. 6 is a perspective view of second embodiment of the fasten-on air bag device of the invention.

FIG. 6 shows a second preferred embodiment of the present invention in which air bag device 12 is designed to be easily coupled with the signal transmission receptacle box 11 and ready for buckling up with the seat belt 13. Basically, the fasten-on air bag device 12 of the second embodiment has the same structure as the first embodiment described above except that shown in FIG. 6. The signal transmission receptacle 11A is designed as a cylindrical like socket that is installed by the seat sides. The receptacle 11A of the embodiment includes an elastic base 111A, a hollow post receptacle 112 and a cover cap 32. The elastic base 111A is provided at the bottom of the signal transmission receptacle 11A and set by the seat sides. The elastic base 111A not only offers a support for the receptacle 11A, that is stiff enough to resist the backfire from the explosion of gas-producing pellets, but also offers a slight elasticity to allow some room for different seating position when wearing the fasten-on air bag device 12. A cable 104 coming from the sensing system 10 is connected to an electrical socket 112A, which is disposed at the top center of elastic base 111A. The electrical socket 112A emerges out from the elastic base 111A and sticks into the coupling opening 112D of the hollow post receptacle 112. The hollow post receptacle 112 extends upward from the elastic base 111A and serves as an anchorage for the hinge pole 121A of the fasten-on air bag device 12. The base of the fasten-on air bag in this embodiment is modified to be a vertically extending hinge pole 121A. The hinge pole 121A serves as an anchor for coupling the fasten-on air bag device 12 with the hollow post receptacle 112. By inserting the hinge pole 121A into the hollow post receptacle 112 through the slot 112D–112G, the electrical connecting bottom end 121B of the hinge pole 121A will contact with the electrical socket 112A of the receptacle 112. A cover cap 32 can be then screwed down to seal the top opening 112D of the hollow post receptacle 112. Two screws 320 or other suitable fastening means can farther fasten the cover cap 32. Thus the hinge pole 121A is now well confined in the top opening 112D of the hollow post receptacle 112. Yet, the air bag device 12 is able to swing laterally within the slot 112C and keeping the connecting end 121B in good contact with the electrical socket 112A, to secure the electrical connection.

Figure 7:
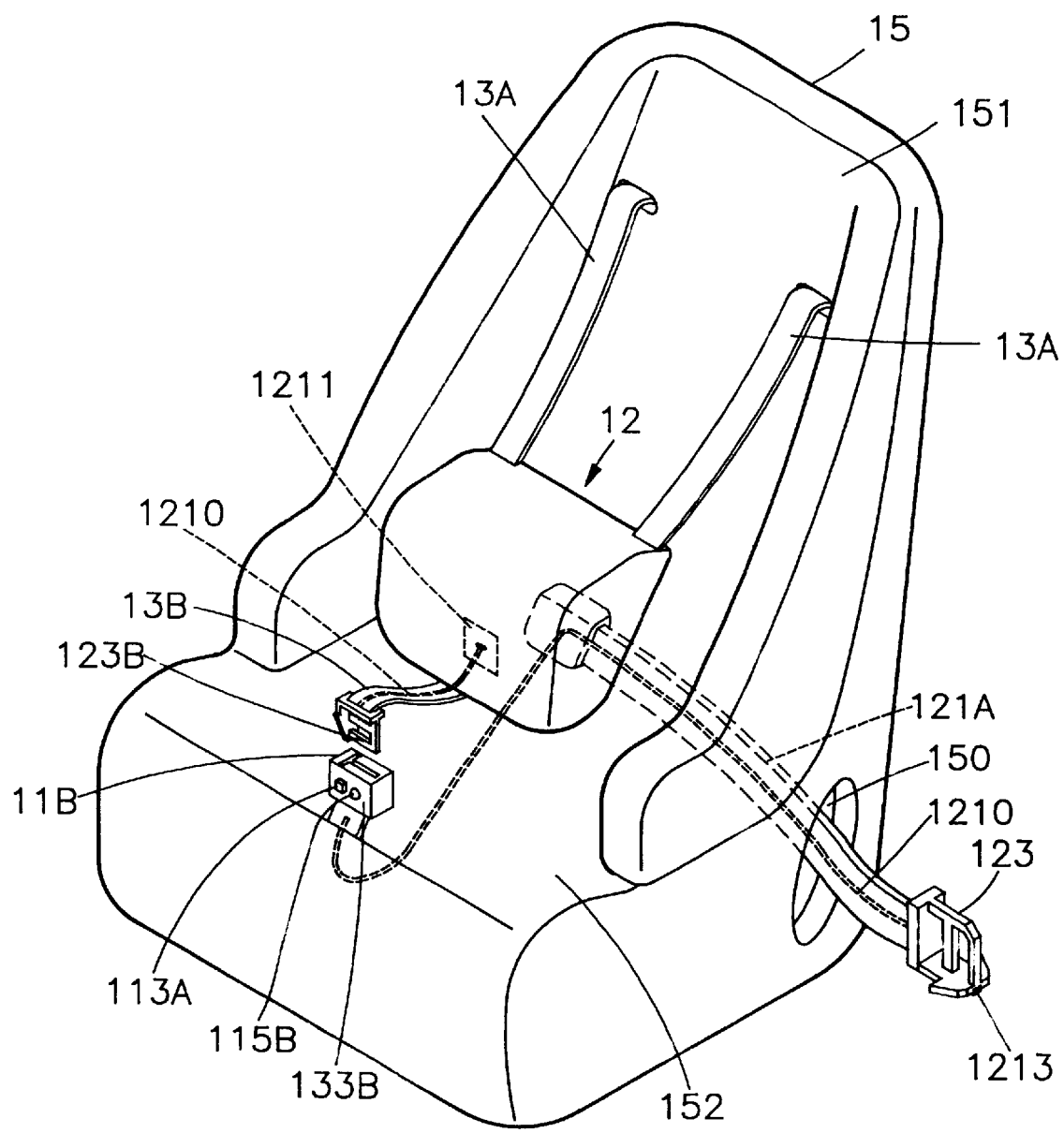
FIG. 7 is a perspective view showing the utilization of the fasten-on air bag device of the invention on a child safety seat.
Figure 8:
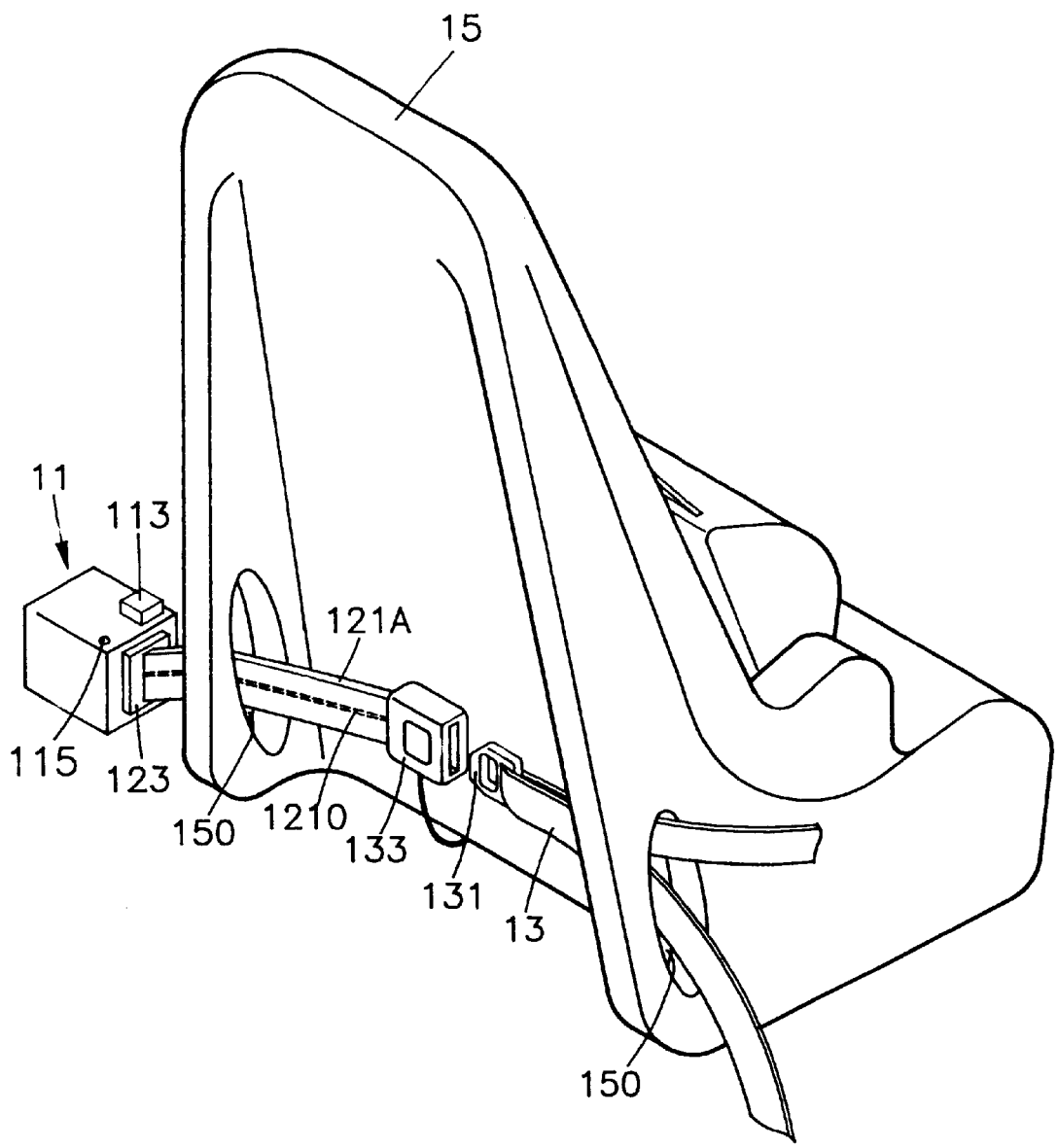
FIG. 8 shows the rear view of the child safety seat of FIG. 7.

FIGS. 7 and 8 show the third embodiment of the fasten-on air bag device 12 of the invention which demonstrates an example that the fasten-on air bag can be modified to be utilized on the child safety seat 15. As shown, a fasten-on air bag device 12, in which the folded air bag 14 and a gas inflator are comprised, is installed between a pair of shoulder straps 13A and a pelvic strap 13B. The fasten-on air bag device 12 is specifically designed to utilize on the child safety seat 15. Two retractable shoulder straps 13A are fixed on the back 151 of the child safety seat 15. A fastener 123B is provided at the end of the pelvic strap 13B and can be inserted into the receptacle 11B at a position between the two thighs of the child when the child is sitting on the seat 15. Inside the receptacle 11B a wire 1210 is embedded under the seat and extends to be encapsulated inside the belt 121A, which is affixed at the back of the seat 15. Moreover, an indicator lamp 115B and a release button 113A are provided on the receptacle 11B. When the wire 1210 is electrically connected, the indicator lamp 115B will be lit up, indicating that the system is properly connected and set in a standby state for utilization in the event of a crash. When depress the release button 113A, it can disengage the fastener 123B of the pelvic strap 13B from the receptacle 11B, allowing the pelvic strap 13B to be withdrawn from the receptacle 11B.

The back of the child safety seat 15 is provided with a buckle 133 that can be plugged in by the conventional seat belt 13. The buckle 133 comprises the belt 121A in which a wire 1210 is embedded. A T-shape fastener 123 is provided at the other end of the belt 121A and can be inserted into the signal transmission receptacle box 11 to make contact of its female connector 124 with the electrical male connector 114 in the signal transmission receptacle box 11. To install the child safety seat, the user simply puts the seat belt through the opening hole 150 at the back of seat and plugs the head 131 of the seat belt into the buckle 133. Then inserts the T-shape fastener 123 into the signal transmission receptacle box 11, Thus finishes the installation of the safety seat as usual way to install the ordinary child safety seat. When the child seats in the safety seat, the user just place the two shoulder straps 13A over the child's head and plugs the fastener 123B of the pelvic strap 13B into the receptacle 11B. By completing the installation and plugging the fastener 123B into the receptacle 11B, the electric circuit from sensing system 10 to the gas producing pellets 1211 is connected. Meanwhile, the indicator lamps 115 and 115B will be lit up showing the sensing system is set in a standby state and ready for utilization. The buckle 133 and the receptacle box 11 are also provided with release button 113, separately, for disengaging the seat belt 13 and the T-shaped fastener 123.

From the foregoing description, it can be learned that the fasten-on air bag device of the invention can be utilized not only at the front seats but also the rear seats. It is easy to be attached and can be carried around by users on board when the user is riding on any transportation means, such as automobiles, buses, trains, or airplanes, to provide cushioned protection of his/her body against impact should a crash take place. In use, the fasten-on air bag device of the invention can be set with the seat belt and be buckled around the body of the occupant. When the air bag device deploys in the event of a crash, the guiding core assures the deployment go outward and forward away from the occupant's body. In addition, the protective shield lining and the spreaded plastic lobes further protect the occupant's body. Therefore, the explosive expansion of the air bag device of the present invention would less likely cause harm to the occupant.

In conclusion, the fasten-on air bag device of the invention has the following advantages over the prior art.

First, the fasten-on air bag device of the invention can be utilized more flexibly on any kinds of transportation means.

Second, the fasten-on air bag device of the invention can be manufactured into various sizes so as to fit all kinds of body sizes for various users. For example, an adult or a fat person can choose a large size one, while a child or a thin person can choose a small size, moreover, even a pregnant woman can choose a special model that suitable for her, so that the cushioned protection can be optimal.

Third, the fasten-on air bag device of the invention can be easily mounted in position for use and is detachable to be replaced. Further, it can be set into the standby state simply by snapping the fastener into the signal transmission receptacle that is connected to the sensing system of the vehicle.

Fourth, when the air bag is being expanded explosively in the event of a crash, the expansion goes outward and forward away from the occupant's body against the steering wheel or dashboard. Therefore, the explosive expansion of the air bag would less likely cause harm to the occupant.

Fifth, the fasten-on air bag device of the invention is easy, safe, and cost-effective to use. The fasten-on air bag device of the invention is effective only when it is plugged in and coupled to the signal transmission receptacle. It will deploy only if it is attached to the occupant and set at the standby state; consequently, the repair cost is relatively low compared to that of the prior art.

The invention has been described using exemplary preferred embodiments. However, it is to be understood that the scope of the invention is not limited to the disclosed embodiments. On the contrary, it is intended to cover various modifications and similar arrangements. The scope of the claims, therefore, should be accorded the broadest interpretation so as to encompass all such modifications and similar arrangements.

What is claimed is:

1. A removable air bag assembly for a vehicle having at least one seat belt assembly including a seat belt buckle and at least one receptacle box, the removable air bag assembly comprising:
   a) a base including a fastener configured to releasably engage the at least one receptacle box;
   b) a protective shield mounted to the base, a portion of the protective shield having an L-shaped cross-sectional configuration;
   c) a folded, inflatable air bag attached to the base and located in the L-shaped portion of the protective shield;
   d) an air bag housing attached to the base and enclosing the protective shield and the folded, inflatable air bag; and,
   e) a socket on the air bag housing configured to releasably engage the seat belt buckle, whereby the air bag assembly is completely removable from the vehicle.

2. The removable air bag assembly of claim 1 wherein the air bag housing is made of plastic.

3. The removable air bag assembly of claim 1 wherein the air bag housing has rupturable seams.

4. The removable air bag assembly of claim 1 wherein the fastener has an inverted T-shaped cross-sectional configuration.

5. The removable air bag assembly of claim 1 wherein the fastener has a cylindrical configuration.

6. A vehicle having a removable air bag and comprising:
   a) a vehicle having at last one seat belt assembly including a seat belt buckle and at least one receptacle box;
   b) a crash sensing system on the vehicle, the crash sensing system including at least one crash sensor and a first electrical connector located in the at least one receptacle box, the crash sensing system producing an electrical signal when data sensed by the crash sensing system exceeds a predetermined threshold;
   c) a removable air bag assembly releasably connected to the seat belt buckle and to the receptacle box, the air bag assembly comprising:
      i) a base including a fastener releasably engaging the at least one receptacle box, a second electrical connector on the fastener engaging the first electrical connector;
      ii) a protective shield mounted to the base, a portion of the protective shield having an L-shaped cross-sectional configuration;
      iii) a folded inflatable air bag attached to the base and located in the L-shaped portion of the protective shield; and,
      iv) an air bag housing attached to the base, and enclosing the protective shield and the folded, inflatable air bag; and,
   d) a socket on the air bag housing releasably engaging the seat belt buckle, whereby the air bag assembly is completely removable from the vehicle and is releasably located between the seat belt buckle and the at least one receptacle box such that, when the crash sensing system produces the electrical signal, the inflatable air bag is inflated in directions away from the L-shaped portion of the protective shield.

7. The vehicle of claim 6 wherein the air bag housing is made of plastic.

8. The vehicle of claim 6 wherein the air bag housing has rupturable seams.

9. The vehicle of claim 6 wherein the fastener on the base has an inverted T-shaped cross-sectional configuration.

10. The vehicle of claim 6 wherein the fastener on the base has a cylindrical configuration.

11. The vehicle of claim 6 further comprising an indicator light on the at least one receptacle box to visually indicate when the first and second electrical connectors are engaged.

* * * * *